Patented Jan. 31, 1939

2,145,639

UNITED STATES PATENT OFFICE 2,145,639

PROCESS FOR THE TRANSFORMATION OF SOLUBLE MIXTURES CONTAINING CHLORINATED RUBBER INTO INSOLUBLE PRODUCTS

Wilhelm Zander, Frankfort-on-the-Main, Germany, assignor to Deutsche Gold- und Silber Scheideanstalts, vormals Roessler, Frankfort-on-the-Main, Germany, a German company No Drawing. Application December 30, 1936, Serial No. 118,412. In Germany January 11, 1936

1 Claim. (Cl. 260—111)

The invention relates to a process for the transformation of soluble mixtures containing chlorinated rubber into insoluble products.

The object of the present invention is the transformation of masses containing chlorinated rubber, which dissolve or swell when contacting with solvents, into a new form, which is substantially immune against the dissolving or swelling effect of said solvents. According to the new process this transformation is performed by the interaction of higher temperatures or short waved light upon the above mentioned mixtures, containing essentially chlorinated rubber, but which are wholly or partially deprived from solvents. The mixtures which may be rendered insensible against the attack of solvents according to the present invention may be prepared by dissolving or mixing chlorinated rubber with suitable subsidaries like natural resins, artificial resins, oils, softening agents, filling materials, pigments, dyes etc., in solvents, swelling agents or indifferent liquids. The mixing or dissolving process may be accelerated by the use of heated rollers, emulgating agents, etc. The mixtures are deprived of constituents which may be evaporated or washed out.

The main feature of the present invention consists of heating the mixtures thus prepared to temperatures between 50 and 220° C. The temperatures employed may vary within said range according to the properties of the mixtures. In general it was found preferable to employ temperatures from 120–180°. A similar effect may be obtained by the interaction of short waved light or ultraviolet rays which may be produced by mercury lamps, arc lamps, electric gas discharging tubes. Both procedures may be employed alone or in combination; likewise the intensity or other properties of the rays as well as the length of exposure may vary according to the nature and composition of the mixtures which are to be rendered insoluble. When combining the use of heat and ultraviolet light temperatures of 50–120° are preferable.

It is possible according to the present invention to protect coatings containing chlorinated rubber against dissolving or swelling agents. Furthermore I may render coatings insoluble in solvents but which may swell. In this way I can apply several coatings upon one another without damaging a lower layer of coating.

In a similar manner plastic masses containing essentially chlorinated rubber may be superficially rendered more or less insoluble whereby the thickness of the layer thus transformed may be regulated in a desired degree, e. g., by varying the length of time, the intensity or manner of heating or exposition to ultraviolet light. The same effect may also be obtained by leaving part of dissolving or swelling agents as well as indifferent agents in the masses in order to retard the transformation effect. Therefore it is also possible to transform the upper layers free from solvents whilst the lower layers remain unaltered.

According to the present invention a steam-jacket heated still for distilling solvents may be coated inside. After evaporating part of the solvent and interaction of a mercury lamp and at the same time heating at approximately 100° the lacquer coating becomes solvent resistant.

Compressed plastic masses which are mixed without solvents by using heated rollers may likewise be rendered solvent resistant when finally heated to increased temperatures.

The invention is not restricted to the use of masses consisting essentially of chlorinated rubber. The masses to be transformed may also contain subsidiary matters in solution, dispersion, in a solid or pasty form. For the production of lacquers natural or artificial resins softening agents, oils, etc., may be combined with chlorinated rubber in known manner. In the case that the before mentioned resins, oils or softening agents tend to be yellowed at higher temperatures, the masses to be transformed may be treated with ultraviolet light, and this treatment may be followed by the exposure of relatively lower temperature in order to obtain the insoluble state. When admixing resins or artificial resins which themselves may be rendered insoluble by heating, like modified phenol-resins, phenol-ether-resins, alcyl-phenol-resins, phtalic-acid-glycerol-condensation products or their combinations with drying or non-drying oils the length of time, of heating respectively of exposure to short waved light, as well as the height of temperature or the intensity of rays may accordingly be lowered. On the other hand higher temperatures or more intense exposure is necessary when using masses which contain only softening agents like phosphoric-acid-esters, adipin-acid-esters, phtalic-acid-esters, toluene-sulphonamid, etc. Elastic masses which may, e. g., be used for the inside coating of tubes can be obtained by employing a relatively high amount of softening agents.

The effect which is obtained by the present process was not to be foreseen, as it was generally believed that masses containing chlorinated rubber are decomposed when heated to temperatures surpassing 100° C. Furthermore it was most surprising that the above mentioned masses after being deprived partially or wholly by solvents become insoluble in solvents when treating according to the present invention.

Example 1

A 30–35% solution of chlorinated rubber and benzene is coated on aluminium and after drying heated to 160° C. during 8 hours. The coating thus obtained is resistant against solvents.

Example 2

5 parts of alcyl-phenol-resin, 10 parts of linseed-oil are heated together. This product is dissolved together with 25 parts of chlorinated rubber and 7–15 parts of tricresylphosphate in 53–45 parts of a mixture of toluene and xylene (1:1). The lacquer thus obtained is coated on aluminium and heated at 180° during 1 hour. This coating is resistant against the dissolving swelling action of benzene and ethyl-acetate.

Example 3

25 parts of chlorinated rubber, 15 parts of a product which was obtained by heating 5 parts of phenol-ether-resin and 10 parts of wood-oil, and 7–15 parts tricresylphosphate are dissolved in 53–45 parts of a toluene-xylene mixture (1:1). This lacquer was coated and after drying heated to 160° during 1 hour. This coating is insoluble in any solvent.

Example 4

25 parts of chlorinated rubber and 7.5 parts of a condensation product of phtalic-acid-glycerol and non-drying olein-acids are dissolved in 62.5 parts of a mixture of toluene-xylene (1:1) together with 10 parts of turpentine. Sheets of aluminium or iron were coated and heated at 170° during 8 hours. By this procedure the lacquer coating became insoluble in any solvent.

Example 5

25 parts of chlorinated rubber and 15 parts of a product obtained by heating 4.5 parts of rosin and 3 parts of shellac together with 7.5 parts of linseed-oil or tricresyl-phosphate with the addition of 7 parts tricresyl-phosphate are dissolved in 53 parts of a toluene-xylene mixture. Coatings of this lacquer were dried and afterwards heated to 180° C. for 2 hours. These coatings remained unaltered after 48 hours' contact with benzene.

Example 6

A lacquer composition prepared by mixing 15 parts of chlorinated rubber, 5 parts of artificial resin (phthalic-acid-glycerol compound together with drying olein-acid and phenol-resin) and 10 parts tricresyl-phosphate are dissolved in 70 parts of a mixture of benzene and ethyl-acetate (1:1) yielded a coating which after 2 hours' heating at approximately 180° had elastic properties and was insoluble in any solvent.

Example 7

The solution of 25 parts of chlorinated rubber and 6–8 parts of wood-oil or wood-stand-oil in 63–65 parts of toluene yielded a foil which after 20 hours' heating at 125° did not yet dissolve in benzene, whilst this solvent showed only a swelling action

Example 8

A sheet of aluminium coated with a lacquer composition described in the foregoing example and after drying at room-temperature was exposed to the action of a mercury-quartz-lamp of 550 watt at a distance of 50 cm. from the burner. The coating, which was originally soluble became substantially insoluble in benzene.

Example 9

The solution of 25 parts of chlorinated rubber and 8 parts of a phthalic-acid-glycerol-resin combined with a non-drying olein-acid in 67 parts of toluene yielded a coating which after an exposure to a quartz-lamp during 20 hours was insoluble in benzene, the latter only having a swelling action upon it. After further heating to 100–120° during 16 hours the coating became wholly insoluble in benzene.

Example 10

The solution of 25 parts of chlorinated rubber and 10 parts of tricresyl-phosphate in 65 parts of toluene yielded a coating which after superficially drying and subsequently 20 hours' exposure to an arc lamp and then 3 hours' heating at 160° C. was not yet soluble in toluene.

Example 11

A plastic mass prepared by mixing of 1 part of phenol-ether-condensation-product with 2–3 parts of chlorinated rubber with heated rollers is soluble in benzene. After pressing, e. g., in the form of plates, these were treated with a mercury lamp during 20 hours and kept at 200° in a heated chamber during one half an hour. The plates are then superficially insoluble in benzene whilst the inner parts remained still soluble.

Example 12

A composition which may be used for the production of compressed bodies was produced by mixing 1 part of chlorinated rubber, 1 part of phenol-ether, 1 part of phenol-ether-condensation product and 2 parts of polymerized vinyl-acetate. This mixture was soluble in benzene-methanol (8:2). After heating at approximately 160° during 16 hours the composition was absolutely insoluble in the described solvent mixture.

I claim:

A process for the production of coatings containing chlorinated rubber which are resistant to the action of solvents comprising coating a surface with a solution containing chlorinated rubber in solution, at least removing the solvent from the outer surface of such coating and then subjecting such coating to irradiation with short-waved rays and a heat treatment at temperatures between 50–220° C. until the portions of such articles which are free from solvents are rendered insoluble.

WILHELM ZANDER.